Figure 1:
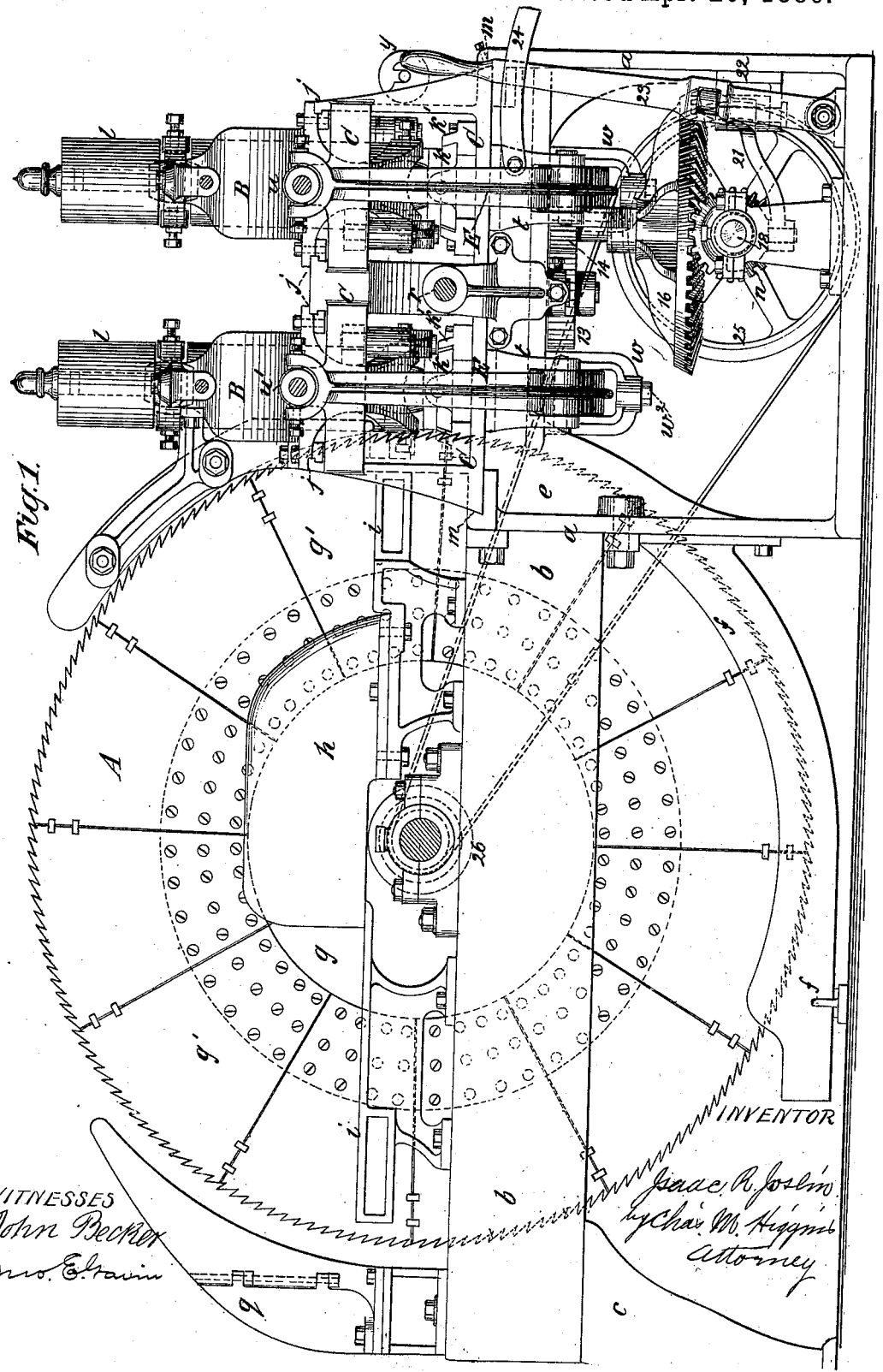

(No Model.)

I. R. JOSLIN.
RESAWING MACHINE.

No. 340,444. Patented Apr. 20, 1886.

WITNESSES
John Becker

INVENTOR
Isaac R. Joslin
by Chas. M. Higgins
Attorney (No Model.) 4 Sheets—Sheet 2.

I. R. JOSLIN.
RESAWING MACHINE.

No. 340,444. Patented Apr. 20, 1886.

WITNESSES
John Becker
Jno. E. Gavin

INVENTOR
Isaac R. Joslin,
by Chas. M. Higgins
Attorney (No Model.) 4 Sheets—Sheet 3.
I. R. JOSLIN.
RESAWING MACHINE.
No. 340,444. Patented Apr. 20, 1886.
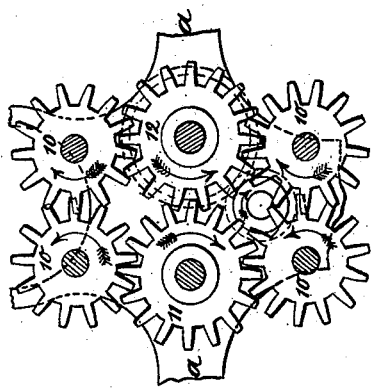
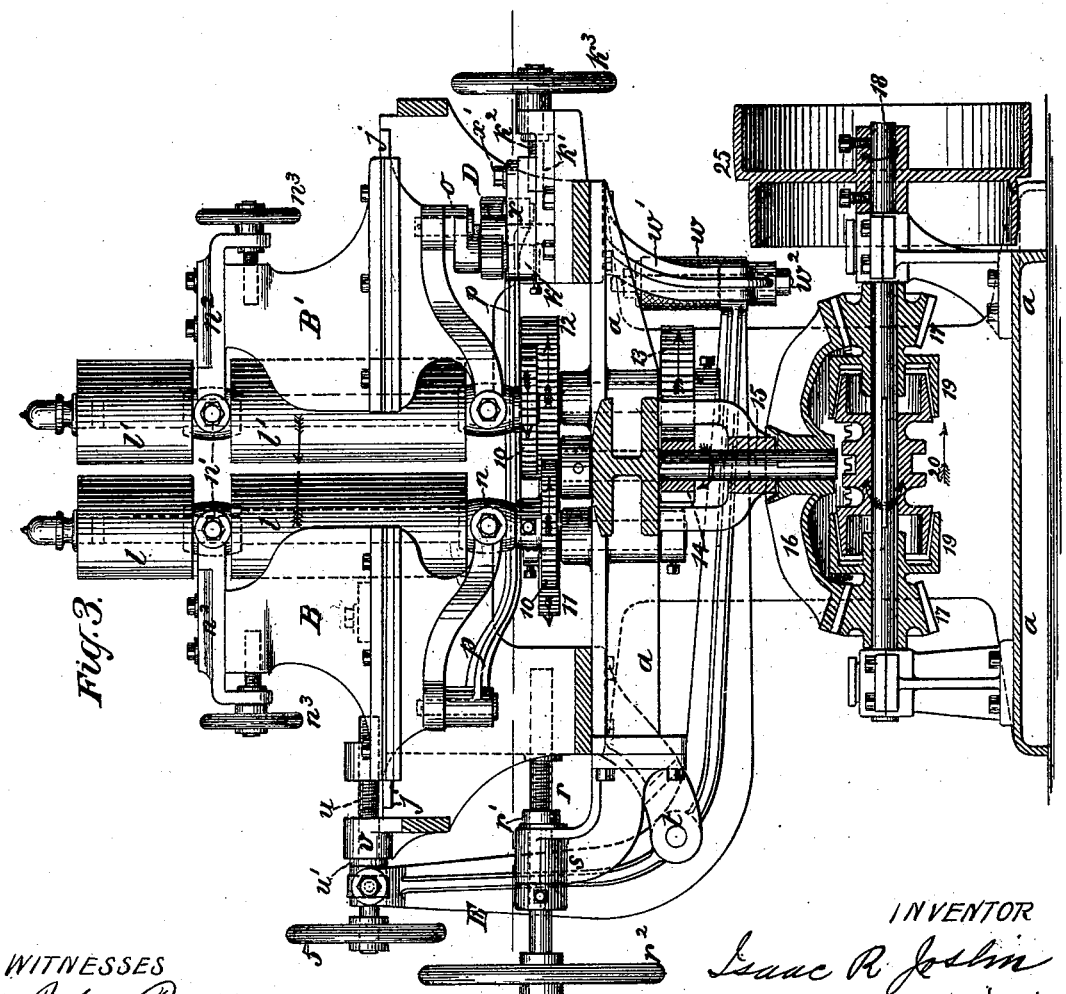
WITNESSES
John Becker
INVENTOR
Isaac R. Joslin
by Chas. M. Higgins
Attorney (No Model.) 4 Sheets—Sheet 4.
I. R. JOSLIN.
RESAWING MACHINE.
No. 340,444. Patented Apr. 20, 1886.
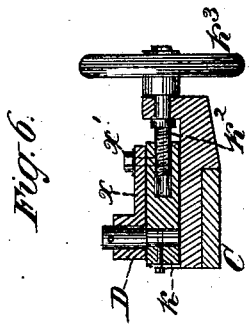
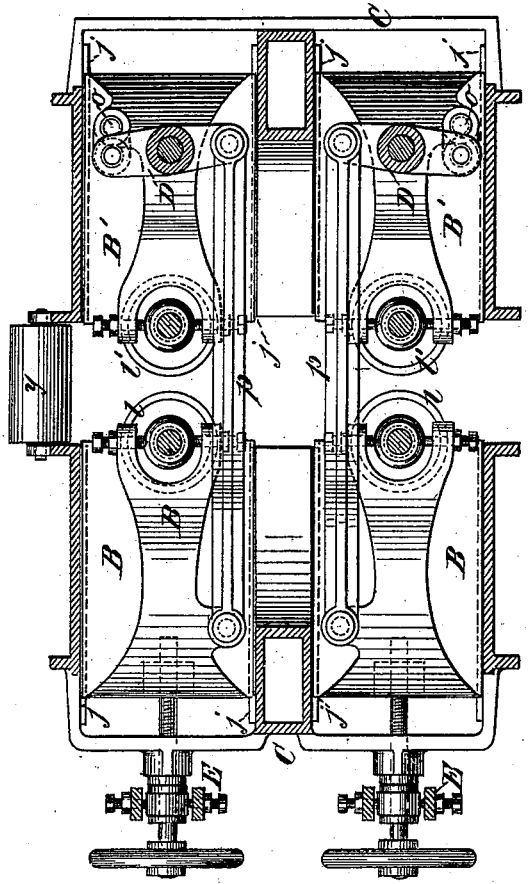
WITNESSES
John Becker
Jno. E. Gavin
INVENTOR
Isaac R. Joslin.
by Chas. M. Higgins
Attorney

UNITED STATES PATENT OFFICE.

ISAAC R. JOSLIN, OF NEW YORK, N. Y.

RESAWING-MACHINE.

SPECIFICATION forming part of Letters Patent No. 340,441, dated April 20, 1886.

Application filed March 31, 1885. Serial No. 160,739. (No model.)

*To all whom it may concern:*

Be it known that I, ISAAC R. JOSLIN, of New York city, New York, have invented certain new and useful Improvements in Resawing-Machines, of which the following is a specification.

My invention applies chiefly to the roller-feed mechanism of resawing-machines, which controls the feed of the board to the saw and regulates the action thereof.

The aim of my invention is to greatly improve this part of the machine, so that the rollers shall be enabled to hold the board with great firmness, and present it so accurately to the saw as to prevent all lateral pressures thereon, which would tend to deflect the saw and make it run out, by which means not only will the sawing be more accurately performed, but it will be possible to use a thin saw, and thereby obviate wide kerfing, and thus accomplish an important saving in lumber. It is also my aim to so mount the rollers and to mutually connect them as to make them quite sensitive to irregularities in the board, and free to move equally in opposite directions according to such irregularities, so as to insure a perfect "self-centering" of the board to the saw, and thus insure an even division of the board when splitting the same, notwithstanding irregularities.

In addition to these objects, I aim to provide the rollers with ample means of adjustment for different contingencies and different classes of work, and I also seek to improve the mechanism for imparting power to the gearing of the rollers, so as to render the same compact, simple, and efficient, and capable of applying forward and backward motion to the rollers in a quick and easy manner. To these ends I construct the machine, as usual, with two successive pairs of feed-rollers leading to the saw, which rollers are mounted on a carriage movable in transverse ways on the machine and adjustable back or forth transversely to the saw, as is usual. Each roller is, however, mounted in a separate roll-stand on this carriage, and capable of an independent sliding or adjusting movement toward or from the other, and the sliding base of the roll-stands is situated at a distance above the base of its roller at or near the average center of grasp on the average board, thus centralizing the strain on the slides and preventing frictional cramping, and thus insuring a smooth and easy movement of the roll-stand in yielding to irregularities in the board. The rollers of each pair are mutually connected by means of an equalizing bar or lever pivoted on the main carriage, having one arm linked to one roll-stand and the other arm linked to the opposite stand, so that the rollers are compelled to open and close in unison and evenly from a common center, thus insuring a perfect self-centering of the board to the saw. This equalizing-bar is disconnectible, when desired, and means are provided to hold the rollers on one side rigid, while the opposite rollers are left yielding, when it is required to divide a board into several slabs. The said yielding action is obtained in a simple manner by means of an elbow-lever pivoted on the carriage, with one arm bearing through an adjusting-screw on the roll-stand, and the opposite arm acted on by a spring or its equivalent. The several feed-rollers are geared together in the usual way; but this gearing is driven from an upright shaft rising from a bevel-wheel under the main carriage, which bevel-wheel gears at opposite sides with two loose pinions on a transverse driving-shaft, which is driven by a belt from the saw-arbor. On the shaft between the pinions is a double sliding clutch provided with a shipping hand-lever, so that if the hand-lever is moved in one direction one of the pinions will be clutched to the shaft and the rollers driven forward to feed the board in, while if the lever be shifted in the opposite direction the other pinion will be clutched to reverse the action and back the board away from the saw, should some emergency require it.

My invention therefore consists, mainly, in the features above outlined, together with several details pertaining thereto, as hereinafter fully set forth.

Figure 2:
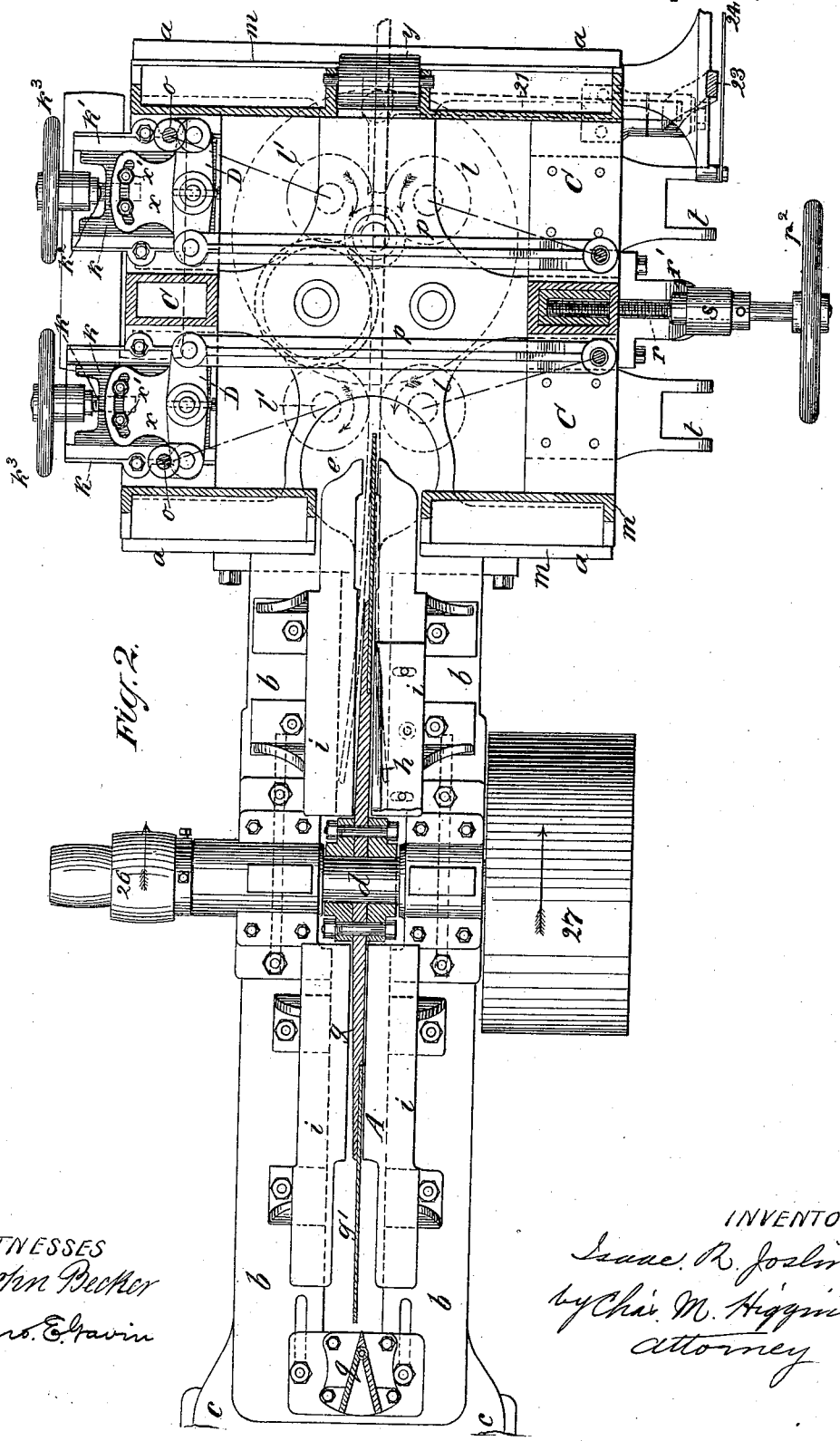

In the drawings annexed, Figure 1 presents a side elevation of my improved resawing-machine. Fig. 2 is a sectional plan thereof, the main carriage being shown in section and the roll-stands removed to show the underlying equalizing-bars and links connecting the opposite stands, the rollers being indicated by dotted lines. Fig. 3 is a front elevation, partly in section, showing the mechanism for driving the roller-gearing. Fig. 4 is a fragmentary plan showing the roller-gearing. Fig. 5 is an inverted sectional plan view of the main carriage and its several roll-stands, showing the equalizing bars and links, which underlie the stands and connect the same. Fig. 6 is a detail of the adjusting device connected with the equalizing-bar.

Referring to Figs. 1 and 2, the general frame-work of the machine is of a T shape, as seen best in Fig. 2, and the machine is made in two main sections—the saw-section and the feed-roller section—each mounted on a distinct frame or casting, which are bolted together to form the complete machine.

The frame of the feed-section is indicated at $a\ a$, and is of general rectangular form, or an open box-shaped casting.

$b$ indicates the frame of the saw-section, which is a long bench-shaped frame or casting supported at the rear end on the leg or legs $c$, and having flanges at the opposite end, which are bolted to the feed-frame $a$, as fully shown in Figs. 1 and 2.

On the middle of the frame $b$ is fixed the journal-boxes in which the saw-arbor $d$ is mounted, and on the arbor is fixed the large circular saw A, in the usual manner, which, being nearly equal in diameter to the length of the frame, rises one half above the frame, while the other half passes down through the central division in the frame, and its forward edge projects into a gap or chute, $e$, in the feed-frame $a$, from which the sawdust-chute $f$ continues under the saw, as well shown in Fig. 1.

The saw A consists, as usual, of the strong central flange, $g$, on which the saw-segments $g'$ are screwed in the well-known manner. (Shown in Figs. 1 and 2.) On one side of the saw opposite the flange $g$ is fixed the shield or dividing-plate $h$, in the usual manner. At the rear of the saw is placed the usual hinged or adjustable spreader, $q$, for spreading the board as it is split by the saw, and on each side of the saw the rests $i\ i$ arise from the frame $b$, to support the edge of the board as it is fed from the saw on each side thereof.

The chief novelty of my invention lies in the feed-section of the machine, as will be now apparent. $k\ k'$ and $l\ l'$ indicate the two pairs of feed-rollers arranged in advance of the saw to feed the board into the same, as usual in resawing-machines. Now each of these rollers is mounted in a small sliding carriage or roll-stand, B B' B$^2$ B$^3$, fitted in guides $j$ in a main slide or carriage, C, which main carriage is in turn fitted in dovetailed ways $m$, running across the full width of the frame. The ways of both the main carriage and the roll-stands, as shown, run across the machine and transverse to the saw, the adjusting movements of both the main carriage and roll-stands being hence, of course, transverse to the saw. An adjusting-screw, $r$, engages in a nut in the middle of the carriage, on the left side thereof and near its base, as best shown in Figs. 2 and 3, and the stem of the screw passes through a bearing-hub, $s$, projecting from the fixed frame, and is provided with an internal abutting collar, $r'$, and an external hand-wheel, $r^2$. It will hence be seen that by turning the hand-wheel $r^2$ one way or the other the main carriage, with its several rollers, may be adjusted bodily from side to side to bring the group of rollers in proper relation with the saw, so as to adjust the grasping-line of the roller in exact line with the saw, or in any other position that may be desired. The shafts of the feed-rollers, as seen best in Fig. 3, are mounted at the lower end in fixed but swiveled bearings $n$ at the base of the roll-stands, and in adjustable swiveled bearings $n'$ at the top, which are adjustable by the slides $n^2$ and hand-wheels $n^3$, as is usual in this class of machines, so that the rollers may be adjusted in inclination to or from each other, or set exactly plumb, as may be required. Now, the opposite roll-stands of each pair of rollers are mutually connected by levers and links—(shown best in Figs. 2, 5, and 3)—that is, under the roll-stands on the right is arranged an equal-armed lever or "equalizing-bar," D, which is fulcrumed or pivoted on the main carriage, while one arm of this lever is connected by a short link, $o$, with the near roll-stand, and the other arm is connected by the long-link $p$ with the opposite roll-stand, as well shown in Figs. 2 and 5. It will therefore be seen that whatever sliding or adjusting movements are made by one roll-stand must be made simultaneously in the opposite direction by the opposite roll-stand, so that the rolls will therefore always open and close or approach and recede evenly from a common center. Now, normally, the roll-stands and rollers are forced toward each other to grasp the board between them by the action of the pressure-levers E E', as shown best in Fig. 3. These levers are of elbow form, sa seen in Fig. 3, pivoted at the bend on lugs $t$, which project down from the main carriage. One arm of each lever projects up on the left side of the carriage and engages a collar, $u'$, on an adjusting-screw, $u$, which passes smoothly through a bearing, $v$, on the main carriage, and engages with a nut on the roll-stands B B, as shown best in Figs. 3 and 1. The horizontal and long arms of the elbow-levers E E' project beneath the carriage, and their ends are received in yokes $w'$, projecting down from the base of the carriage, and rubber springs $w$ press on the ends of said levers within the yoke, the springs being held in place by central bolts, $w^2$, so that said springs exert a constant pressure on the levers to force the roll-stands together, as will be readily understood from Fig. 3. The adjusting-screws $u\ u$ are provided with hand-wheels 5, and the collars $u'$ of the adjusting-screws abut against the exterior of the bearings $v$. It will hence be seen that by turning the wheels 5 5 one way or the other the left roll-stands, B B, may be adjusted in or out, and as the rollers are connected by the equalizing bars and links before noted the right or opposite roll-stands will be adjusted equally in opposite direction, and hence both rollers will open and close evenly and equally from a common center, which will normally be the center of the saw-blade. It will also be seen that by turning the screw $u$ out in a direction to force the collar $u'$ against the pressure-lever any desired tension may be put upon the springs of the levers, and this tension, reacting on the roll-stand, will force both rollers together with any desired pressure which it may be desired to put upon the board seized by them, so that, therefore, the hand-wheels 5 and screws $u$ not only serve to adjust the tension of the spring-pressure on the rolls, but also serve to adjust the distance between the rolls to open or close them more or less, according to the width of the board to be admitted. Now, the equalizing-bars D are not pivoted directly on the frame of the main carriage C, but on an adjustable slide, $k$, (see Figs. 1, 2, 3, and 6,) which is mounted in ways $k'$ on the right side of the carriage, and provided with an adjusting-screw, $k^2$, and hand-wheel $k^3$, arranged as well shown in Fig. 6, so that, hence, by turning said hand-wheel $k^2$ one way or the other the slide $k$, with its equalizing-bar D and the pair of roll-stands therewith connected, may all be adjusted bodily back or forth across the carriage, and hence this provides an independent adjustment for each set of rollers and roll-stands in the main carriage, so that both pairs of rollers may be set in exact line with each other and with the saw, or more or less out of line, as circumstances may require.

The general construction of the machine and the different means of adjustment having been now described, the action of the machine will be readily understood. The saw and feed-rollers being set in motion, as usual, the board to be split is placed edgewise on the roller $y$, on the front end of the machine, and is thence entered between the rollers, which will at once seize it and advance it against the saw, which will divide the board, as indicated in Fig. 2, one half of the board being deflected off by the flange $g$ and the other half by the dividing-plate $h$. It may now be noted, by referring to Fig. 2, that in my machine the saw projects up very close to the feed-rollers, or, in fact, within the line of the rollers and close to the grasping portion of the same; hence the rollers take their grasp upon the board as near as possible to the saw, and are thus enabled to control the movements of the board better and allow the least possible deflection thereof before reaching the saw. This near approach of the saw to the rollers, in connection with the system of equalizing-bars connecting the roll-stands, are very important features of my machine, for not only is the best possible grasp taken on the board and the least possible deflection allowed as it approaches the saw, but at the same time the rollers will yield perfectly equal in opposite directions at any irregularity in the board, thus always self-centering the board to the saw, and preventing the deflection of the board to either side of the saw, or the putting of any pressure on the side of the saw; or if any such side pressure occurs it will occur equally on opposite sides of the saw, thus keeping the saw straight and central and preventing the running out of the saw; hence by these means not only will very accurate sawing be effected and injury or waste of lumber by the running out of the saw prevented, but the use of a very thin saw will be practicable, and therefore great saving of lumber effected by obviating the necessity of a wide kerf. The above results are also in a great measure effected by reason of the firm pressure which I am enabled to put upon the rollers and yet secure their perfect free movement in their guides when yielding to irregularities. This will be understood by referring to Figs. 1 and 3, where it will be seen that the guides $j$, in which the roll-stands B B move, are not situated at the base of the stands and their rollers, as usual, but at or near the middle of the stands, and some distance above the base of the rollers, and at such a position as will correspond nearly with the middle of the average width of board passed between the rollers; hence the strain or pressure on the rollers in grasping the board will be centralized in line or nearly in line with the guides of the roll-stands, and therefore there will be little or no tendency to frictionally cramp the stand in its guides, but it will be able to move with great freedom and ease when yielding to irregularities in the board, notwithstanding the fact that a firm pressure may be exerted by the spring-levers to hold the rolls firmly to the board, which feature is a most important advantage of my machine.

Referring to Figs. 3 and 2, it will be understood that the different hand-wheels on the machine control the different adjustments, which are ample for all contingencies. Thus the wheels 5 5 adjust the opening or closing of the rolls and the tension of the spring-levers E. The wheels $k^3$ $k^3$ adjust each pair of roll-stands relatively to each other and to the saw, while the wheel $r^2$ adjusts the main carriage, with its group of rollers, bodily to or fro in relation to the saw.

Referring to Figs. 2 and 6, it will be seen that the equalizing-bars D are formed with slotted segments $x$, which overlie the slides $k$, and are guided thereon by bolts $x'$, which bolts are normally loose, to leave the segment and equalizing-bar free to swing in correspondence with the yielding motions of the roll-stands. When, however, it is desired to have the rollers and roll-stands on one side rigid, while those on the other side are left yielding, then the bolts $x'$ are tightened to hold the equalizing-bars stationary, and the links $p$ $p$ are disconnected from the roll-stands B. The roll-stands B and their rollers $l$ will now be free to move or yield independently of the roll-stands B' and their rollers l', which latter will remain fixed or rigid, but may be adjusted in or out, as may be required, by turning the hand-wheels k³, as will be understood.

The above-described position of parts will generally be used when a thick board is to be divided into several slabs, or when several uniform thicknesses are to be sawed from a thick board, and it will therefore be seen that the equalizing connection of the rollers for evenly dividing boards does not prevent successive division from the same board, when desired, as the machine may be easily adapted to either class of work, as described.

Referring to Figs. 3 and 4, it will be seen that the several feed-rolls are geared together by ordinary long-toothed gearing in the usual way, well shown in Figs. 2 and 3, and therefore needing no special description.

Referring to Fig. 4, it will be understood that the gear-wheels 10 of the feed-rollers do not gear with each other, but with large intermediate wheels, 11 12, which wheels 11 and 12 gear together, and are mounted in the fixed frame a a, and hence are stationary in said frame, while the roller-gears 10 are movable and adjustable with the main carriage C or their roll-stands B B', and hence are capable of moving tangentially in relation with the wheels 11 12 without ever getting out of gear therewith. Now, instead of the complicated and indirect arrangements of pulleys and belts as commonly used for imparting motion to this gearing, I employ a simple and compact arrangement of gearing, clutches, and belt, which forms another feature of my invention—that is, referring to Figs. 3 and 4, it will be seen that the shaft of one of the large intermediate gear-wheels, 12, which mesh with the gear-wheels of the rolls, is provided near the base with the gear-wheel 13, which is engaged by the driving-pinion 14, as best seen in Figs. 3, 4, and 1. This driving-pinion 14 is fixed to the top of a vertical driving-shaft, 15, which is provided at the bottom with a large bevel gear-wheel, 16, which gears at opposite sides with two loose pinions, 17, on a horizontal driving-shaft, 18, all of this gearing being compactly placed, as shown in Figs. 1 and 3, directly below the carriage C in the main frame a a. Each of the loose pinions 17 is provided with a conical clutch cup or socket, 19, and on the shaft between said cups is keyed a sliding double clutch, 20, having conical plugs at each end, adapted to engage the socket of either pinion when slid in one direction or the other, as will be understood from Fig. 3. One arm of an elbow-lever, 21, (see Fig. 1,) is engaged with a groove at the middle of the clutch 20, and this lever being pivoted at the bend in lugs 22 on the front of the frame a, as seen in Fig. 1, has the opposite arm projected out and engaged with a hand-lever, 23, which is pivoted at the base of the frame a and rises up on one side of the machine, being guided by an arc, 24, near the table of the machine, and having its handle projecting in convenient proximity to the hand of the operator when standing before the machine. On the outer end of the shaft 18 is fixed a large cone-pulley, 25, having two or more diameters, and on the arbor d of the saw is fixed a corresponding cone-pulley, 26, of small diameter, (see Fig. 2,) from which a direct belt is passed to drive the pulley 25, as shown in Fig. 1. On the opposite side of the saw-arbor is fixed the large pulley 27, as seen in Fig. 2, whereby power is applied both to revolve the saw and the feed-gearing driven by the shaft 18. It will therefore be now observed that when power is applied to the large pulley 27 motion will be imparted to revolve both the saw and the shaft 18, with its clutch 20, and if, now, this clutch is shifted to the right (see Fig. 3) by moving the hand-lever 23 back to the left (see Fig. 1) the pinion 17 on the right will be clutched to the shaft and the wheel 16 and shaft 15 and pinion 14 revolved in the direction indicated in Fig. 3, and the rollers thereby revolved in a direction to feed in the board, as indicated in Figs. 3, 4, and 2. If, however, the motion of the hand-lever is reversed, the clutch 20 will be shifted and the opposite pinion, 17, clutched and the parts all revolved in the reverse direction, thus backing the rollers and causing the board to retreat from the saw. If, however, the hand-lever and clutch are moved to the mid-position, the feed mechanism will be stopped and the board held stationary; hence by this combination of mechanism not only is the power imparted from the saw-arbor in a simple direct manner with but one belt and a compact and simple arrangement of gearing, but the feed motion may be instantly stopped and reversed, which is of great advantage in case of meeting with some obstruction in the board which would tend to injure the saw or make it run out of true.

I do not of course confine myself to the exact form of equalizing connections between the opposite rollers and roll-stands illustrated, as any connections causing the roll-stands to move in opposite directions in unison with each other may of course be employed without departing from the principle of my invention. I would also here remark that a weight might act as the equivalent of the spring w to load the levers E, but the latter is preferable.

Referring to Figs. 1 and 2, it will be seen that as the frame of the machine is made in two distinct sections bolted together, one section, b b c c, carrying the saw, while the other section, a a, carries the roller-feed mechanism, the machine can therefore be easily separated into the two sections and packed compactly for transportation, and can be again easily put together when arriving at its destination, which is an important practical advantage.

What I claim as my invention is—

1. In a resawing-machine, the combination, with a series of feed-rollers, of a main carriage on which the stands are mounted, adjustable transversely to the saw, independent roll-stands B B', adjustable on said carriage, equalizing-bar D, pivoted on said carriage, and links o p, connecting said bar with the opposite stands, substantially as and for the purpose set forth.

2. In a resawing-machine, the combination, with the feed-rollers, of the adjustable roll-stands having the sliding guides or ways of said stands arranged at a distance above the base of the rollers at or near the average center of grasp on the board, substantially as and for the purpose set forth.

3. In a resawing-machine, the combination, with the pair of feed-rollers and their adjustable roll-stands, and the supporting-frame on which said roll-stands slide, of the equalizing-bar D, pivoted on the supporting-frame and linked at opposite sides with the respective roll-stands, with the segment $x$, attached to said equalizing-bar and adapted to be clamped to or unclamped from the supporting-frame, and with the disconnectible link $p$ between the equalizing-bar and the opposite roll-stand, substantially as shown and described.

4. In a resawing-machine, the combination, with a pair of feed-rollers and their roll-stands, of the equalizing-bar D, connecting-link $p$ between said bar and stands, and adjustable slide or support $k$, on which said bar is pivoted, substantially as herein set forth.

5. The combination, with the main carriage C and roll-stands B B', mounted to slide thereon, and rollers $l\ l'$, carried by said stands, of the pivotal slide $k$, fixed on the main carriage C, equalizing-bar D, pivoted on said slide, connecting-links o p between said equalizing-bar and the roll-stands, and means for adjusting said slide, substantially as herein set forth.

6. In a resawing-machine, the combination, with a fixed frame and a pair or series of feed-rollers, and a main carriage on which the same are mounted, and independent roll-stands adjustable on the same, of the elbow-lever E, pivoted on and moving with said carriage, with one end bearing on one of the roll-stands, and the other end loaded to press the said stand and its roller toward the opposite roller, substantially as shown and described.

7. In a resawing-machine, the combination, with the main carriage C and a pair or series of feed-rollers mounted thereon, of the movable roll-stand B, adjusting-screw $u$, engaged with said roll-stand, fixed abutment $v$, extending from said main carriage and through which screw passes, collar $u'$ on said screw bearing against said abutment, and the elbow-lever E, having one arm engaged with said collar and the opposite arm loaded with a spring or its equivalent, substantially as set forth.

8. The combination, with the carriage C, a pair of feed-rollers, and an adjustable roll-stand, B, of the elbow-lever E, pivoted on said carriage and having one arm bearing against said roll-stand, with the yoke $w'$ fixed to said carriage, and spring $w$ bearing on the opposite arm of said lever within said yoke, substantially as shown and described.

9. In a resawing-machine, the combination, with the series of feed-rollers and gearing connecting them, of the bevel gear-wheel 16, connected with the said roller-gearing, with the driving-shaft 18, arranged diametrical to said wheel, and provided with the double-friction cone clutch 20, sliding on a key thereon, with the pinions 17 17, loose on said shaft and engaging with the opposite sides of said wheel 16, and provided with the friction-cups 19 19, substantially as shown and described.

10. In a resawing-machine, the combination, with the saw and saw-arbor $d$ and the feed-rollers, with the gearing connecting them, of the pulley 26 on the saw-arbor, and pulley 25, to which motion is imparted with the shaft 18, pinions 17, clutches 19, and sliding clutch 20 on said shaft, with the bevel-wheel 16, meshing with said pinions and geared with the roller-gearing, substantially as shown and described.

11. In a resawing-machine, the combination, with the feed-rollers and gearing connecting them, of the bevel-wheel 16, geared with said gearing, driving-shaft 18, placed diametrical to said wheel, pinions 17 17, loose on said shaft and geared with opposite sides of said wheel, and provided with friction-cups 19, double sliding clutch 20, movable on a key on said shaft, between said cups, with the operating elbow-lever 21 and hand-lever 23, arranged and operating substantially as shown and described.

ISAAC R. JOSLIN.

Witnesses:
GEORGE T. LAWRENCE,
HENRY FAXON, Jr.